United States Patent [19]

Knutson et al.

[11] Patent Number: 5,707,527
[45] Date of Patent: Jan. 13, 1998

[54] APPARATUS AND METHOD FOR TREATING STORM WATER RUNOFF

[75] Inventors: John H. Knutson, Hillsboro; James H. Lenhart, Aloha; Michael Owen Myers, Portland, all of Oreg.

[73] Assignee: Stormwater Treatment LLC, Portland, Oreg.

[21] Appl. No.: 641,282

[22] Filed: Apr. 30, 1996

[51] Int. Cl.$^6$ .............................. C02F 1/28; C02F 1/42; E03F 5/16

[52] U.S. Cl. .......................... 210/660; 210/691; 210/693; 210/694; 210/170; 210/266; 210/747

[58] Field of Search .................... 210/170, 747, 210/165, 166, 266, 282, 660, 691, 693, 694

[56] References Cited

U.S. PATENT DOCUMENTS

| | | | |
|---|---|---|---|
| 3,674,687 | 7/1972 | Quase | 210/86 |
| 4,135,908 | 1/1979 | Widmer | 71/9 |
| 4,829,045 | 5/1989 | Fransham | 502/401 |
| 4,976,873 | 12/1990 | Ross | 210/744 |
| 5,133,619 | 7/1992 | Murfae et al. | 404/4 |
| 5,223,154 | 6/1993 | MacPherson, Jr. et al. | 210/790 |
| 5,294,337 | 3/1994 | Johnson | 210/266 |
| 5,296,293 | 3/1994 | Jobst | 428/403 |
| 5,297,367 | 3/1994 | Sainz | 52/12 |
| 5,316,589 | 5/1994 | Krieger, Jr. | 134/10 |
| 5,322,629 | 6/1994 | Stewart | 210/767 |
| 5,330,651 | 7/1994 | Robertson et al. | 210/617 |
| 5,391,295 | 2/1995 | Wilcox et al. | 210/165 |
| 5,419,838 | 5/1995 | DiTullio | 210/747 |
| 5,437,786 | 8/1995 | Horsley et al. | 210/170 |
| 5,458,769 | 10/1995 | Johannessen | 210/165 |
| 5,511,904 | 4/1996 | Van Egmond | 405/52 |
| 5,549,817 | 8/1996 | Horsley et al. | 210/122 |
| 5,573,349 | 11/1996 | Paoluccio | 405/52 |
| 5,624,552 | 4/1997 | Vales et al. | 210/170 |
| 5,632,889 | 5/1997 | Thorp | 210/282 |

FOREIGN PATENT DOCUMENTS

054684  1/1975  Japan.

OTHER PUBLICATIONS

"The Radial Filter," Aero-Mod Incorporated, Manhattan, Kansas, May, 1993.

*Primary Examiner*—Cynthia L. Nessler
*Attorney, Agent, or Firm*—Christensen, O'Connor, Johnson & Kindness

[57] ABSTRACT

Apparatus and for the treatment of storm water runoff to remove contaminants that accumulate in the storm water when it flows over paved surfaces in urban areas. The apparatus includes a basket that has an outer surrounding water-permeable wall, and an inner water-permeable wall, spaced from and surrounded by the outer wall. A bed of an absorbent, able to absorb contaminants in the storm water, is disposed in the space between the outer and inner walls, while allowing fluid communication between the walls. An inner drainage space is defined by the inner wall and is in fluid communication with the absorbent. During operation, storm water flows through the outer permeable wall, into the bed where it is treated; and treated water flows from the bed through the inner wall into the inner drainage space. Treated water then flows from the drainage space, in some embodiments under a siphon-effect, into a treated water drainage conduit for disposal. The absorbent may be selected from compost, vermiculite, activated carbon, peat, ion exchangers, clays, and the like, and may be in the form of pellets or particulates. The baskets are of modular construction so that the beds are in containers that may be removed and replaced, with minimal labor. Moreover, the baskets may be backflushed to remove particulates and debris that clog the beds and retard the treatment rate.

7 Claims, 6 Drawing Sheets

APPARATUS AND METHOD FOR TREATING STORM WATER RUNOFF

FIELD OF THE INVENTION

The invention relates to the treatment of water, especially storm water runoff to reduce levels of contaminants such as heavy metals, oils and greases, organic toxins, and the like. More particularly, the invention provides a modular basket-type apparatus that contains a bed of a material, such as an absorbent or an ion exchanger, that is able to remove the contaminants from the storm water. The modules are assembled in a storm water collection and treatment zone so that storm water is treated by removing contaminants while it flows through the modules, and then flows into drainage conduits for environmentally safe disposal.

BACKGROUND OF THE INVENTION

Storm water runoff is a form of diffuse or non-point source pollution. It is caused by rain washing pollutants, such as particulate matter, organic matter, heavy metals, and organic toxins into receiving natural bodies of water. As a consequence, natural bodies of water that receive storm water also receive pollutants that have harmful environmental effects. The amount of pollution entering into such receiving bodies of water is related to the degree of urbanization in the surrounding area and the nature of the urbanization. Urbanization results in the paving of land with waterimpermeable materials, such as concrete, upon which pollutants tend to accumulate over time. Rain falling upon this type of surface washes the pollutants into the storm water runoff system and thence into the receiving water body.

Several hundred years ago storm water runoff was not a significant problem. Rain fell on earth rich in organic matter formed by the accumulation of decayed vegetation. This organic matter absorbed and filtered the water before it made its way into the groundwater, streams and rivers. In addition, the undisturbed soils lost little particulate matter due to erosion, and there was insignificant, if any, amounts of oil and grease, heavy metals or organic toxins to be carried into the receiving wetlands, streams and rivers.

Now, however, due to increasing urbanization, storm water runoff has been identified as a significant source of pollution in receiving water bodies. Storm water differs from waste water in many ways. Unlike wastewater, which flows more or less continuously year around, storm water is intermittent, and usually shows seasonal peaks. Pollutant concentrations in storm water, in addition to being highly dependent on localized factors, are also correlated with rainfall interval spacing. In other words, the longer the period between storms, typically the greater the potential for high pollutant concentration(s) when a rainfall event occurs. This is due to the continual accretion of pollutants on surfaces between rainfall episodes. Thus, potential damage to receiving water ecosystems is often greatest after a prolonged dry spell, such as occurs during summer periods over much of the west coast of the United States, when the first storms of the fall season wash particularly concentrated accumulations of toxic materials off roadways and other surfaces. These first flush events occur when receiving streams are at low flow and dilution of the pollutants from the storm water is limited. The degree of pollution of the receiving water body is heavily rainfall intensity dependent. Therefore the heaviest pollutant loading at the end of a dry spell may not occur during the first storms, if these storms are not of sufficient strength to flush pollutants off the rainfall receiving surfaces.

Within a particular storm event, there is also what is known as the "first flush" phenomenon. Generally, the first flush occurs during the first half-hour or so, when the rain is flushing the amassed buildup of pollutants that has accumulated during the interval since the preceding storm, and pollution loadings are highest. Even if the storm lasts several hours or more, contamination levels during the remainder of the storm are usually low or even undetectable.

In an effort to address the pollution problems posed by storm water runoff, U.S. Pat. No. 5,322,629 proposes a method and apparatus for treating storm water. In accordance with the invention of the '629 patent, storm water is passed through a bed of high quality leaf compost material that removes pollutants from the runoff prior to its discharge into a water-receiving system. The patent also illustrates and describes embodiments of an apparatus that facilitates the treatment of the water through the bed of compost. The '629 patent recognizes that the compost may compact over time so that the flow of storm water through each square foot of the bed is reduced. This flow rate through the bed, referred to as its "permeability" in the '629 patent but more correctly termed its "infiltration capacity," is an important parameter. If the infiltration capacity of the bed, i.e., the flow rate in gallons per minute through a square foot of the bed, is low, then a large bed is needed to treat a specified rate of water runoff. On the other hand, if the infiltration capacity is high, then a smaller bed may be used but there may be insufficient contact between the water and the compost for removal of pollutants. Moreover, storm water carries with it sediment, such as sand and other particulates, that can cause gradual clogging up of flow channels in a compost bed so that infiltration capacity is reduced.

In order to enhance long-term infiltration capacity, the '629 patent teaches that at least about 15% by dry weight (of the compost) of gravel or crushed rock should be added to and mixed with the compost to form a bed. Nevertheless, despite such gravel addition, it has been found that over a period of time the infiltration capacity of the compost bed decreases so that the bed must ultimately be replaced. Replacement generally requires some manual labor, and is relatively expensive especially since the operation does not generate revenue for the municipality maintaining the sewer. Municipalities would prefer a storm water runoff treatment system that significantly reduces the frequency with which compost beds must be replaced in order to conserve limited financial resources. However, excessively large beds, to allow for decreasing infiltration capacity over time, are also not favored due to their higher initial capital cost. Thus, a desirable replacement medium for the compost beds should have high initial infiltration capacity, and maintain a significant proportion of this infiltration capacity for a long period of time, preferably a period of several years, that constitutes its useful life.

SUMMARY OF THE INVENTION

The invention provides an apparatus and method for the treatment of storm water runoff to remove contaminants such as heavy metals, traces of oils and greases, organic toxins, and the like that storm water typically accumulates when flowing over paved areas before entering into storm water runoff drainage system. The apparatus contains a bed of an absorbent, or ion-exchange medium for the contaminants and has a high initial infiltration rate that may be at least partly recovered by periodic backflushing. The basket-type apparatus of the invention is modular and is therefore easily replaced; moreover, the absorbent beds are selfcontained and easily replaced when they are spent. The apparatus can remain in service for long periods of time, with minimal maintenance, except for periodic backflushing to remove accumulated debris from the beds to maintain an effective infiltration rate through the beds.

The apparatus of the invention includes a basket, typically a cylindrical basket, that has an outer water-permeable wall, and an inner water-permeable wall spaced from, and surrounded by, the outer wall. A bed of an absorbent that is able to absorb contaminants from the storm water runoff is disposed in the space between the outer and inner walls while allowing fluid communication between these walls. An inner treated water drainage space is defined by the inner water-permeable wall, and a treated water outlet duct extends from this drainage space to allow flow of treated storm water out of the basket. The apparatus operates when it is at least partially submerged in storm water runoff so that the water infiltrates through the outer water-permeable wall, through the bed where contaminants are removed, through the inner water-permeable wall, and thence into the inner treated-water drainage space for removal through the outlet duct. In order to control the rate of flow through the basket to a rate less than the initial infiltration capacity of the basket, a flow restrictor, such as a minimum flow orifice plate or a valve, is inserted into the outlet duct. The restricted flow rate is selected to allow sufficient contact between the storm water and the bed to remove a substantial portion of at least one contaminant from the storm water.

In certain preferred embodiments, the apparatus includes an outlet siphon priming valve that allows a siphoning effect to occur so that water flows continuously through the basket and into a drainage conduit that is in fluid communication with the outlet duct. In these embodiments, the outlet valve is optionally a water level actuated siphon priming valve that is able to at least partially cover the opening of the outlet duct and thereby restrict flow of treated storm water through the duct. Thus, when the storm water runoff rate to the apparatus is low, and the basket is not fully submerged, then treated storm water flows through the basket, into the outlet duct through the partially open siphon priming valve, and into the drainage conduit. However, when the storm water runoff rate is above a threshold level, so that the basket becomes completely submerged and the inner drainage space fills with treated water, then the outlet siphon priming valve opens completely and a continuous fluid communication is established between the inner drainage space and the drainage conduit. Thus, water is continuously siphoned through the basket, thereby enhancing the treatment rate of the storm water. In order to actuate the siphon priming valve to achieve the siphon effect, a linkage extends from a floatable valve member upward to a float mounted above the drainage space. The float is in fluid communication with the drainage space so that when the drainage space fills with storm water, the float rises by floating on the water and lifts the valve member thereby opening the outlet duct of the basket completely. The exclusion of air from the drainage space and the liquid communication with the drainage conduit establishes the maximum siphon effect.

In accordance with the invention, the bed may be selected from those materials that are able to remove heavy metals, oils and greases, organic toxins, and other contaminants that storm water typically accumulates when flowing over paved areas in residential or industrial communities before entry into a storm water drainage system. These materials include absorbents such as compost, particularly aged deciduous compost, vermiculite, activated carbon, peat, and ion exchangers such as zeolite, perlite, clay minerals, commercial ion exchange resins, silica sand, or mixture of these. In certain preferred embodiments, the bed is made up of pellets. The pelletized form provides the advantage of maintaining a high flow rate through the treatment bed by minimizing clogging of the bed that might otherwise arise from the accumulation of fine particulate debris in a non-pelletized bed.

Optionally, in order to further protect the bed from infiltration of particulate matter that causes clogging and reduced flow, the outer surface of the outer waterpermeable wall may be covered with a removable filter, such as a cloth filter. Periodically, this filter can be removed and replaced. When this filter is used, the bed requires less frequent back-washing.

The invention also provides a system for treating storm water that includes at least two of the modular baskets described above, that are located in a treatment zone with their outlet ducts in fluid communication with a common drainage conduit. In this system, storm water runoff from a storm water drainage pipe enters into a forebay that includes a storm water settling basin sized for allowing settling of particulates and debris from the storm water. Clarified storm water overflows from this settling basin into the storm water treatment zone that includes the baskets, each constructed as described above. In the preferred embodiment, that includes an outlet siphon priming valve, when water enters into the treatment zone at above a threshold flow rate, the baskets are submerged in the storm water. The storm water is drawn through the baskets, where it is treated, by the siphon effect. On the other hand, when the storm water runoff flow rate into the treatment zone is less than the threshold flow rate, so that the baskets are not completely submerged, then water flows through the baskets at a lower rate through the partially open siphon priming outlet valve in the outlet conduit of each basket, and thence into the common drainage conduit.

The invention also provides a method of treating storm water runoff to remove contaminants. The method includes allowing the water to infiltrate through the water-permeable outer wall surrounding the basket and treating the water through the treatment bed. A flow restrictor controls the flow rate of the storm water through the basket to a lower rate than the initial (or potential) infiltration capacity of the treatment bed in the basket, as explained above. Otherwise, in the preferred embodiment that has a siphon priming outlet valve, the flow rate may be controlled by this valve that is partially open when the storm water runoff is less than a threshold rate. When the storm water runoff exceeds this threshold rate, the siphon valve is completely open and the rate of flow through the basket, and hence the rate of water treatment, is ordinarily controlled by the flow restrictor in the outlet duct of the basket which has a higher pressure drop across it than the open siphon valve.

The invention provides significant advantages in maintenance because the apparatus are modular. Each of the baskets is a self-contained module that can be removed and replaced by a replacement basket, whenever necessary. Moreover the bed in each basket may be self-contained and removable so that replaced, whenever necessary, without having to remove the basket. Additionally, the beds of the apparatus are readily backflushed in order to remove debris and restore the infiltration rate of the basket. Backflushing is achieved by closing an outlet valve to seal off the outlet duct of the basket, connecting a water hose to the top of the inner drainage space, and flowing water at a high rate into the inner drainage space of the basket so that the water is forced outward: through the inner wall, the bed, and the outer water-permeable wall of the basket. The backflush water may then be collected, for example, by vacuum truck, and removed. In the preferred embodiments that include a siphon effect valve, backflushing requires adjusting a means for holding the float in place so that the siphon effect valve remains at least partially closed and there is no need to close a valve or the outlet pipe. The flow rate of backflush water into the drainage space exceeds the restricted flow through the closed valve and allows ready backflushing of the treatment bed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides apparatus and a method for removing contaminants from storm water runoff. These contaminants include heavy metals, automotive fluids, and other contaminants that enter the storm water as a consequence of its flow over paved surfaces in urban areas before it enters into a storm water drainage system. The apparatus is conveniently modular allowing the removal of spent treatment beds and replacement with substitute beds with minimal labor. Moreover, beds may be "regenerated" to regain infiltration capacity through a backflushing technique, as explained below.

Advantageously, in a preferred embodiment of the invention, the apparatus includes a siphon priming outlet valve that induces a siphon effect when it operates. This siphon effect increases as the bed becomes progressively more plugged with sediments, helping to maintain high flow through the basket. This preferred embodiment operates under one of two modes. When the apparatus is effectively fully submerged, storm water runoff is siphoned through the apparatus, and into a drainage conduit for treated water, by the siphon effect. On the other hand, when the apparatus is not effectively fully submerged, flow through the apparatus is restricted by the outlet siphon priming valve that is designed to allow a minimum flow therethrough, when closed. Thus, when the storm water runoff is below a threshold level sufficient to cause effective submergence of the apparatus, the storm water is nevertheless treated through the apparatus. However, when the storm water runoff rate is above the threshold level, and the apparatus is effectively submerged, the treatment rate is enhanced by the siphon effect. Under these conditions, the water treatment rate may be controlled by a flow restrictor in the outlet of the basket, as explained below.

The invention may be more fully understood with reference to the accompanying figures, which are representational and that illustrate schematically certain preferred embodiments of the invention. Clearly, a person of ordinary skill in the art will, after reading this disclosure, appreciate other embodiments that are within the scope of this disclosure and the appended claims.

Figure 1:
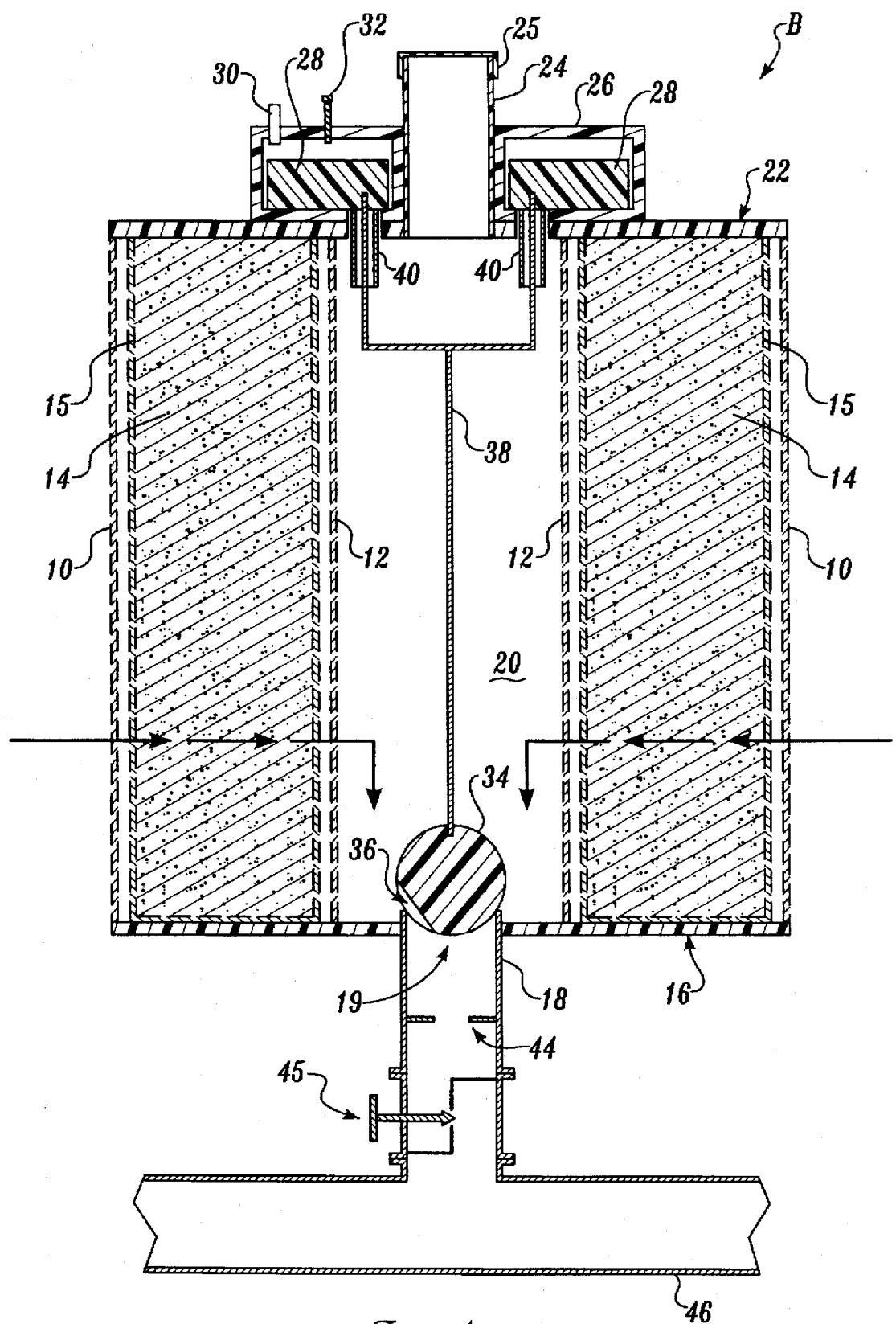
FIG. 1 is a schematic cross-sectional side view of a treatment basket in accordance with the invention.
Figure 1A:
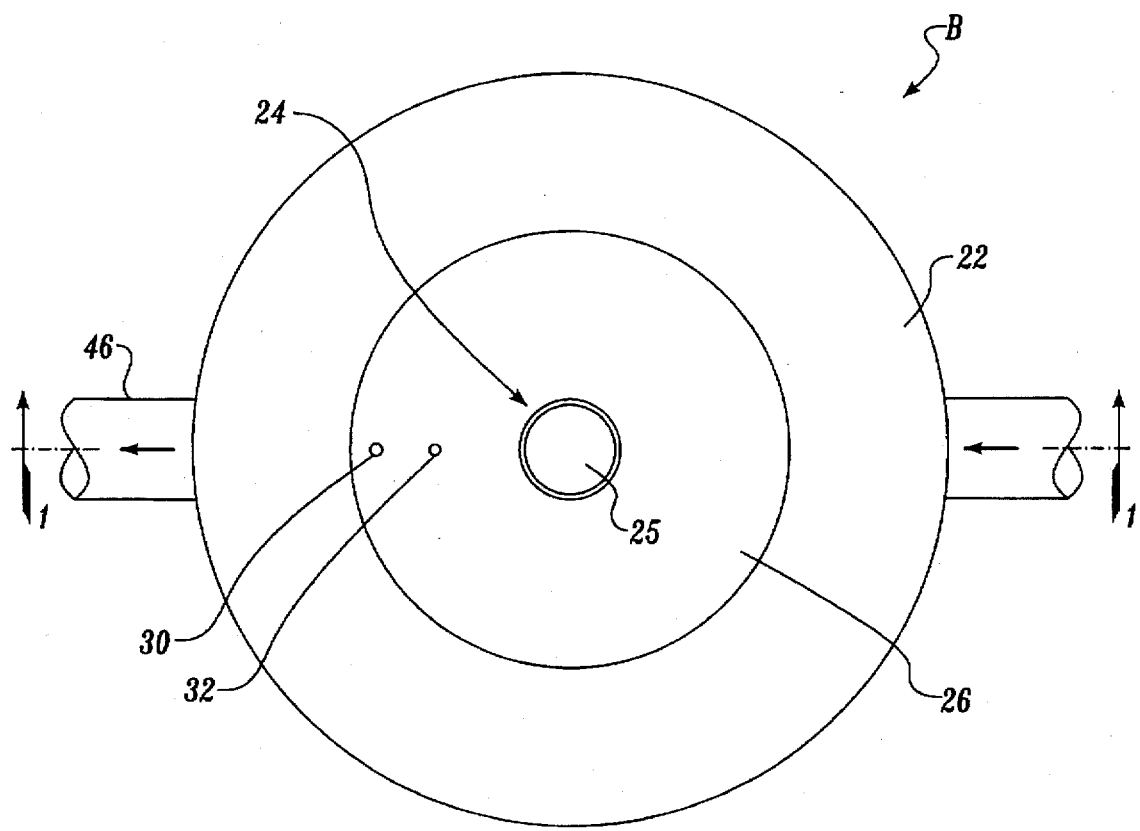
FIG. 1A is a schematic top view of the basket of FIG. 1.

Referring to FIG. 1, a basket B has a vertical water-permeable outer wall 10 that surrounds the basket. Preferably, as shown in FIG. 1A, the outer wall is substantially cylindrical and may be fabricated from coated steel wire mesh to prevent corrosion, or stainless steel mesh, or plastic mesh. The basket B also has a vertical inner wall 12, concentric with and spaced from the outer wall 10. As indicated in FIG. 1A, the inner wall is preferably also cylindrical so that an annular space is formed between the inner and outer walls. The inner wall is waterpermeable and is preferably also constructed of a mesh material. A treatment bed is disposed in the space between the inner and outer walls. Preferably, this bed 14 is a bed of deciduous aged compost (U.S. Pat. No. 5,322,629 is hereby fully incorporated by reference), zeolite, peat, activated carbon, clay, ion exchange medium, sand or mixture of these, or any like substance that is able to remove contaminants from the storm water. In preferred embodiments, the bed material is in the form of pellets. The use of pellets minimizes clogging of the bed with particulates or sediment carried in the storm water so that the bed maintains a high infiltration rate for a longer period of time. This minimizes the requirement for periodic backflushing to remove particulates and unclog the bed. Preferably, the pellets are in the size range from about ⅛ to about ⅜ inch for a bed having an inner wall diameter of 5" and an outer wall diameter of 18". For much larger beds, the size may be scaled up.

As illustrated in FIG. 1, the bed is supported by a base 16 (circular in the case of a cylindrical basket) of water-impermeable material, such as plastic or metal, that extends horizontally engaging the lower end of the outer surrounding wall thereby sealing the underside of the basket. An outlet duct 18 extends from the center of the base and is in fluid communication with an inner drainage space 20 that is defined by the inner wall 12. In the embodiment shown, the inner drainage space is cylindrical and the outlet duct 18 extends from the center of the base of the cylindrical space. The basket is also supplied with a water-impermeable, removable top, likewise of plastic or metal, that extends horizontally across the upper end of the basket B that engages the upper end of the surrounding outer wall 10 sealing the top of the basket. A backflush pipe 24 extends vertically through the center of the top so that it is in fluid communication with the inner drainage space 20. The upper end of the backflush pipe is sealed with a cap 25 so that the pipe may be closed when the apparatus is in normal use.

In the preferred embodiments of the invention, as explained above, the basket is able to siphon storm water through the bed to a treated water drainage conduit. In these embodiments, a float housing 26 is located on the top 22 of the basket and surrounds the backflush pipe 24. As shown in FIG. 1A, the housing is in the form of a ring with the backflush pipe extending through its center. Viewed in cross section in FIG. 1, the housing contains a float, preferably made of a lightweight material, such as expanded polystyrene, that floats in water. The float is sized to fit within the housing and is able to float up towards a top surface of the housing, when the housing fills with water. This upward floating of the float is important because this mechanism opens the siphon priming outlet valve, as will be explained. The float housing includes a one-way vent tube 30 that is in fluid communication with the inside of the housing, the drainage space of the basket, and the surrounding environment. Thus, the vent tube allows expulsion of air from the housing when water rises into the housing. In order to prevent the float from rising when water enters into the housing during back flushing, the housing is equipped with a set screw 32 that extends threadingly through an upper surface of the housing. This screw is adjustable so that it is able to press the float 28 onto the base of the float housing and prevent the float from lifting to open the siphon-control outlet valve when water enters into the housing, during a backflush operation, as will be explained below.

Figure 1B:
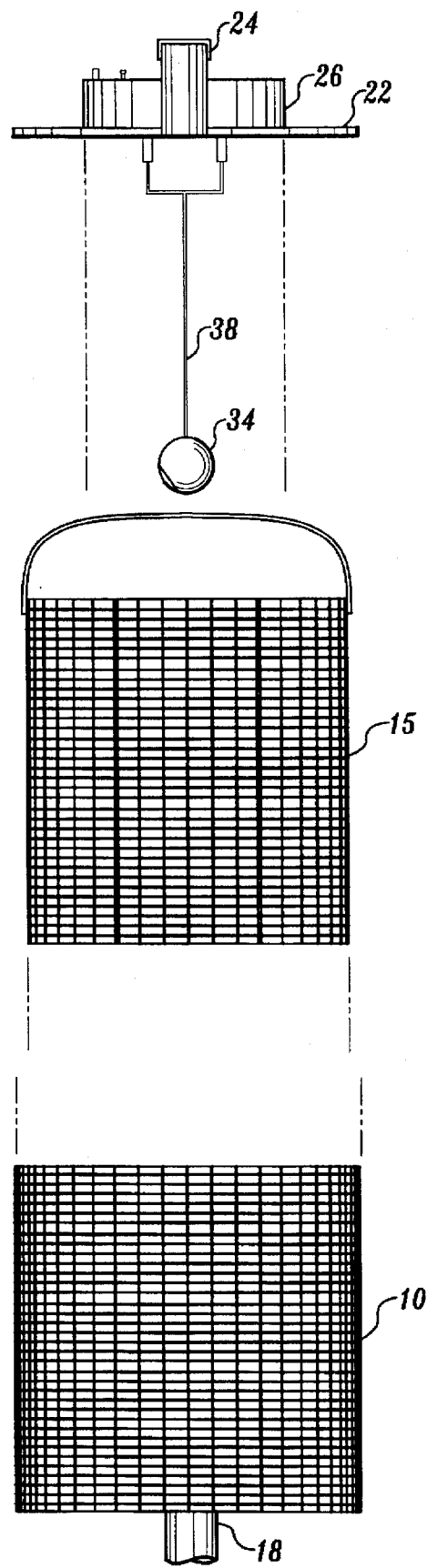
FIG. 1B is an exploded view of the basket of FIG. 1, showing the removable absorbent bed container.
Figure 1C:
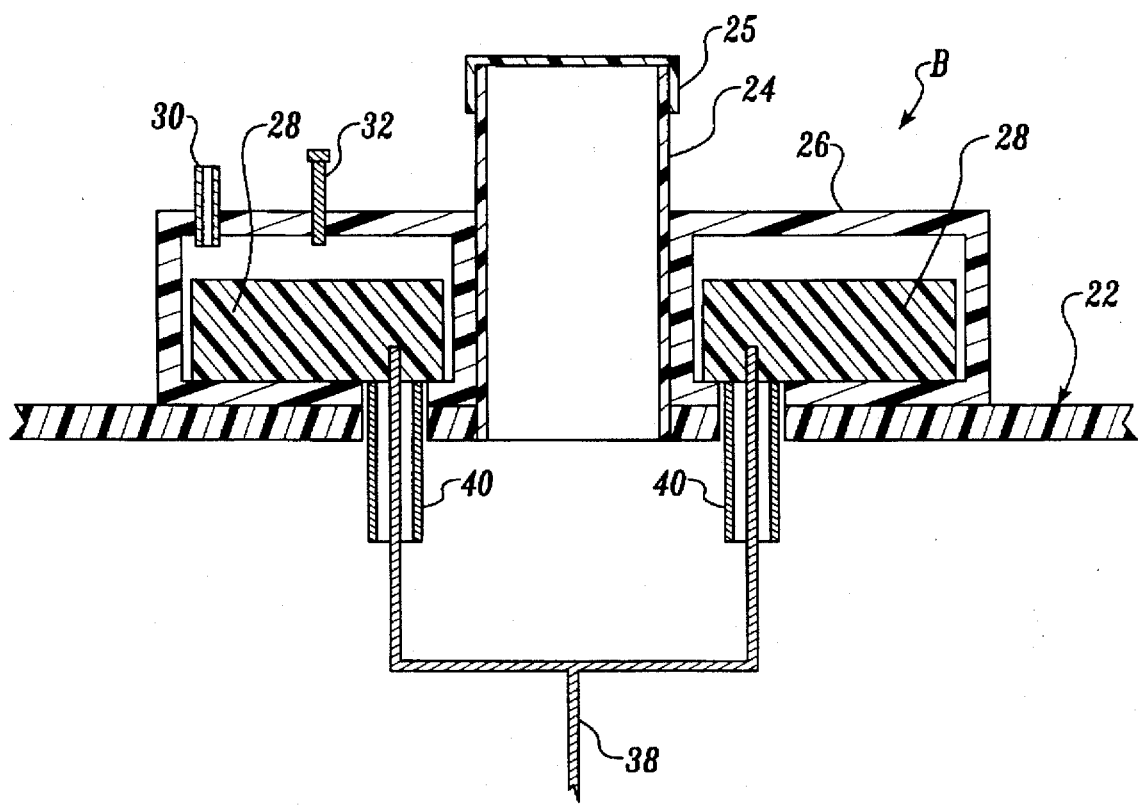
FIG. 1C is an enlarged view of the upper portion of the basket of FIG. 1 showing details of the float and its housing.

A spherical floatable valve member 34 rests on the mouth 19 of the outlet duct 18 and restricts flow of treated storm water through the outlet duct. As shown in FIG. 1B, the valve member 34 is notched 36 to allow flow of water past the ball and through the outlet duct, even when the valve is closed. Alternatively, the mouth 19 of the duct 18 may be notched to allow flow even when the valve member is seated on the mouth. As explained above, when the storm water runoff rate is below a threshold level, the basket may not be completely submerged, but treatment of water is still required. A float linkage 38 extends from the valve member 34 to a pair of spaced-apart float chamber drainage tube connectors 40. Each of these connectors extends through a hole in the top 22 of the basket B, through the base of the float housing 26 and has an end connected to the float 28. The holes through which the connectors extend have sufficient clearance around the connectors to establish fluid communication between the drainage space 20 and the interior of the float housing 26. Thus, when the basket is being submerged in storm water, water enters into the drainage space 20 displacing air upward and out of the basket through the vent tube 30 in the float housing 26. When the water level reaches the top 22 of the basket B, water enters into the float housing via the holes through which the float tube connectors extend. The water causes the float 28 to float and rise, which in turn causes the linkage 38 to lift the valve member 34 from the mouth 19 of the outlet duct 18. Under these conditions, a siphon effect is set up so that storm water runoff is continuously drawn into basket, through the outlet duct, and into the treated water drainage conduit 46. However, this flow rate is restricted, by placing a flow restrictor 44 in the throat of the outlet duct 18. Preferably, this flow restrictor is an orifice plate with an orifice of predetermined size. However, an adjustable valve 45, such as a needle, gate or other valve, and other flow adjustment devices, are also useful.

The magnitude of the siphon effect is directly dependent on the level of plugging of the bed. Thus, the higher the sediment plugging load of the bed, the lower the flow rate through the bed. Prior to sediment plugging, water will flow freely through interstitial spaces in the medium of the bed and the flow will be restricted through the flow restrictor (orifice or valve) to a rate that will allow sufficient contact between the water and the bed for removal of contaminants. Under these conditions, the pressure drop through the bed is relatively low so that there is a positive water pressure inside the drainage space 20 that is only slightly less than the positive pressure of water surrounding the basket. However, once the bed has become severely plugged with sediment, the bed presents a large pressure drop for flow. At some point, this pressure drop exceeds the pressure drop through the flow restrictor, so that the bed ultimately controls the flow of water through the basket. However, when a siphon effect is induced, in accordance with the invention, by purging air from the drainage space, a negative pressure develops inside the drainage space. This results in suctioning of water through the bed into the drainage space, and thence into the drainage conduit 46.

The siphon control valve member 34 (shown as spherical but other shapes are clearly also useful) is buoyant, and once lifted, will float to the top of the drainage space 20. Before being lifted by the float 28, the member 34 is held in place by the pressure of water in the drainage space 20, flowing over the valve member through the notch 36. However, when the inner drainage space 20 is filled with water, and the float 28 floats, then valve member 34 is lifted and floats upward clear of the mouth 19 of the outlet duct 18. An exemplary valve member 34 is a hollow 2.7 inch diameter plastic sphere partially filled with sand to a mass of about 75 g. This provides a suitable ball density and density gradient. Clearly, other sizes and shapes of valve members are also useful.

As shown in FIG. 1B in an optional embodiment, the bed 14 is contained within a separate water-permeable housing that is removable from the basket, so that spent beds may be readily removed and replaced with fresh beds of absorbent. Under these circumstances, all that is required is the removal of the top 22 from the basket, removal of the bed container 15, and replacement with a container with a fresh bed. The top is then replaced and the basket is ready for use.

During backflushing, of the preferred embodiment with the siphon valve, the cap 25 is removed from the backflush pipe 24. A water supply is coupled to the backflush pipe and water is forced into the inner drainage space 20. This water flows radially outward through the bed, removing trapped sediments, and carrying these out through the outer surrounding mesh wall 10. Preferably, backflushing is carried on for about 3 minutes (or about 30 gallons). Backflush water may be vacuumed up and removed or deposits settled to the tank bottom. Preferably, this water is not recycled through the baskets, since reclogging may occur. The backflush procedure is highly effective in restoring a significant proportion (about 70 to 80%) of the initial infiltration capacity of the modular treatment baskets of the invention. When an embodiment of the invention that includes a siphon priming outlet valve is being backflushed, the set screw 32 is adjusted to prevent floating of the float 28 and hence opening of the valve member 34. Then, water is flowed through the basket, as explained above. This flow, counter-current to the normal radially inward flow in a cylindrical basket, flushes particulates and debris from the bed to restore at least a portion of the initial infiltration rate. As explained, the flow restrictor controls flow through the basket in normal use, when the actual infiltration rate of the freshly installed or unplugged baskets would otherwise exceed the restricted flow rate. This restricted flow rate is selected to allow sufficient contact between the bed and the storm water for treatment.

Optionally, the outer wall 10 of the basket may be surrounded by a covering filter material. This filter 11 may be of cloth or paper to prevent fine particulates from entering into the bed and causing clogging of the bed. This permits the bed to retain a high infiltration capacity for a longer period of time, and extends the periods between backflushing operations. Preferably, the filter is of a type that is removable and readily replaceable, with minimal manual labor.

Figure 2A:
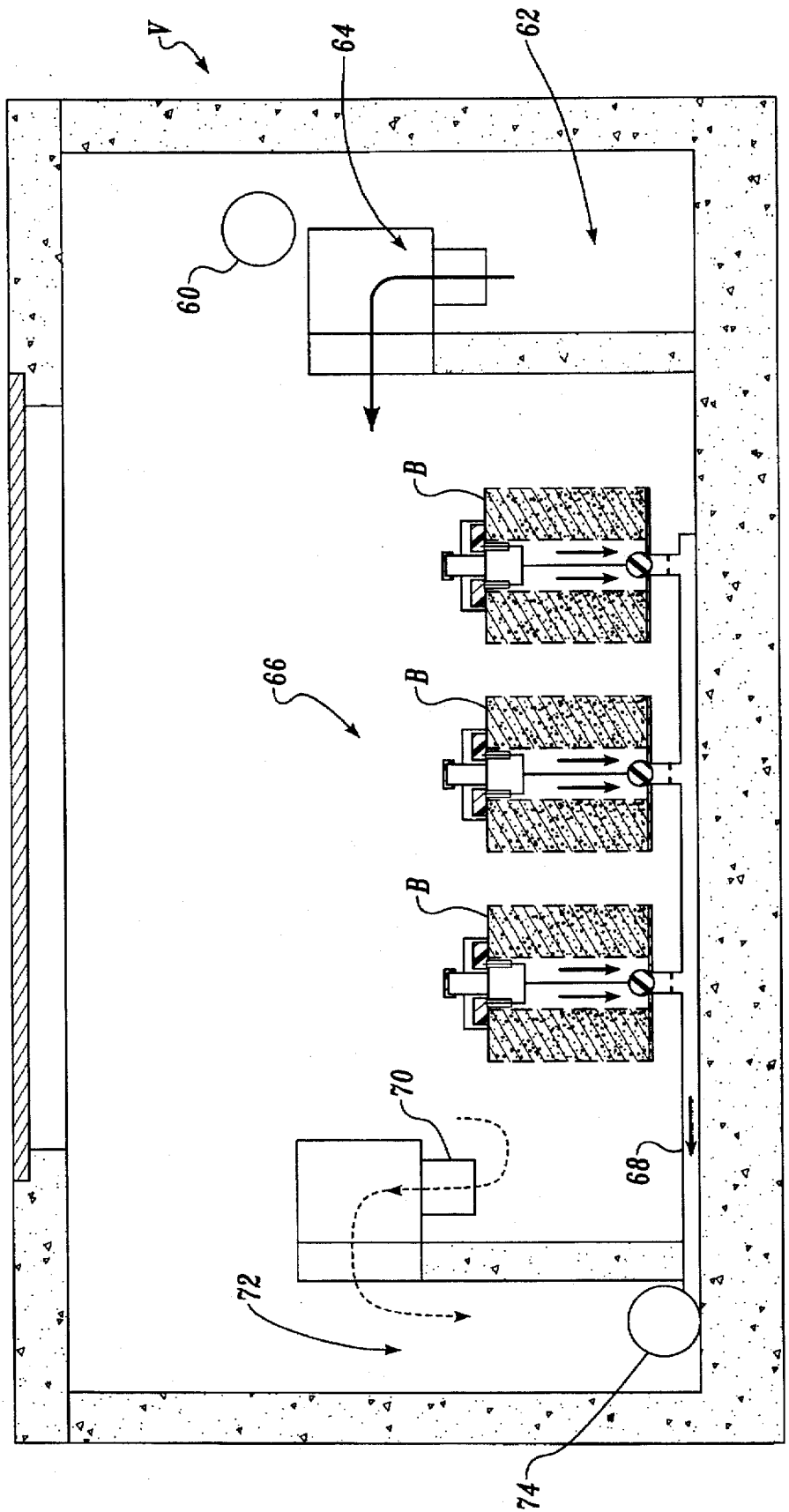
FIG. 2A is a schematic cross-sectional side view of an apparatus in accordance with the invention that includes at least two treatment baskets.
Figure 2B:
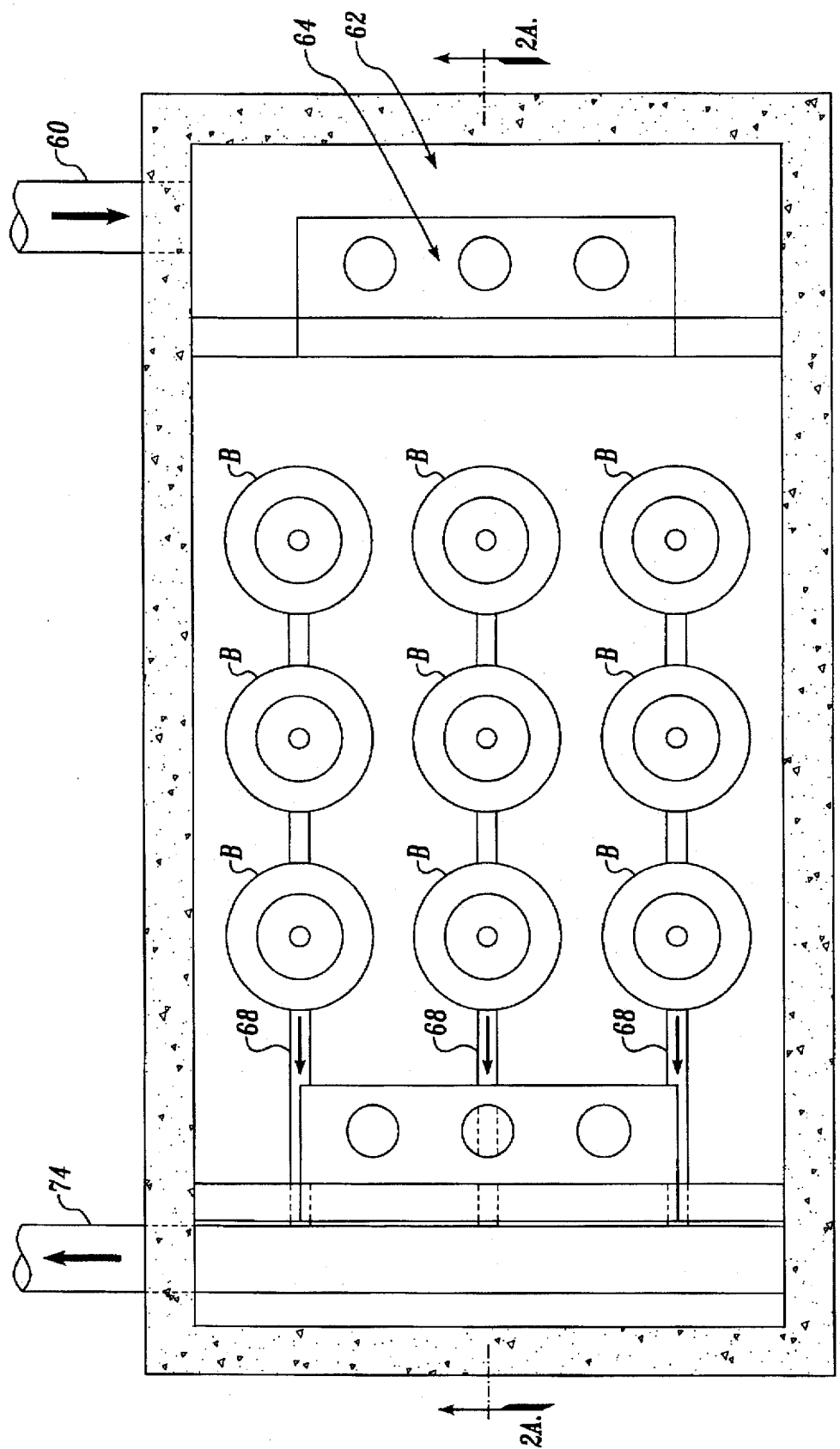
FIG. 2B is a plan view of the apparatus of FIG. 2A.

As indicated above, the baskets may be used singly, or in a group, in a system for treating large volumes of storm water runoff. FIGS. 2A and 2B illustrate schematically a system in accordance with the invention that utilizes a plurality of modular treatment baskets. As shown, storm water enters a vault V through an inflow pipe 60 and flows into a settling forebay 62. The water resides in this forebay for a residence time sufficient to allow settling of large particulates and other debris. The water then overflows from the settling bay through an overflow clarifier 64 into a treatment zone 66 of the vault V. The treatment zone includes a plurality of baskets B, several of which are connected to common treated water drainage ducts 68. Thus, as ducts 68. Thus, as shown, the outlet ducts 18 of three of the baskets are connected to a common drainage duct 68. The operation of the baskets, and their construction, are as explained above, except that a row of baskets connected in series may have a common flow restrictor (an orifice plate or a valve) in their common drainage pipe 64, located downstream of all the baskets to restrict flow through all baskets. When storm water inflow into the treatment zone 66 greatly exceeds the capability of the treatment baskets to treat water, even under the siphoning effect, then the water level in the treatment zone will rise. At some point, the water may overflow from the treatment zone through the overflow inlet 70 and thence into the overflow bay 72 from which it is removed by the drain pipe 74. Advantageously, however, each apparatus of the invention is adequately sized so that such overflow seldom occurs, and will occur only during an unusually severe rainstorm.

The invention also provides a method of treating storm water runoff. This method includes allowing the water to infiltrate through a water-permeable outer wall that surrounds a basket that contains a bed of material able to remove contaminants from the storm water. The bed removes pollutants from the storm water as the storm water flows through the bed. The flow rate of the storm water through the bed is controlled to a rate lower than the initial infiltration capacity of the bed. This control may be effected by a flow restrictor, such as a valve or orifice plate, in an outlet duct of the basket, as explained above. Moreover, the method includes using a siphon priming valve, as detailed above.

The invention provides a cost-effective apparatus and method of treating storm water runoff, requiring minimal capital investment, and low maintenance costs. Moreover, the apparatus of the invention is flexible in that it is able to treat the rates of storm water runoff resulting from relatively small rain showers, as well as the rates of storm water runoff from rainstorms. Advantageously, in normal use, the apparatus does not require energy for pumps or any other driven or moving equipment, and uses only gravity, and gravity effects, to produce a treated water effluent that is more suitable for disposal.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of treating storm water runoff, the method comprising:

(a) allowing the runoff water to infiltrate through a water-permeable outer surrounding wall of a basket containing a bed comprising material able to remove pollutants from the storm water;

(b) treating the runoff water by removing pollutants from the storm water by passing the storm water through the bed contained within the basket to an interior drainage space;

(c) establishing continuous fluid communication between the interior drainage space of the basket and a treated water outlet conduit;

(d) siphoning treated water from the drainage space under gravity into the treated water outlet conduit; and (e) controlling a flow rate of the storm water through the basket to a lower rate than an initial infiltration capacity of the bed, the controlled lower rate allowing sufficient contact between the storm water runoff and the bed to remove a substantial proportion of at least one pollutant from the storm water runoff.

2. The method of claim 1, wherein the allowing of step (a) comprises allowing the storm water to flow horizontally through the bed, the bed disposed in a space between the waterpermeable outer wall of the basket and an inner water-permeable wall of the basket.

3. The method of claim 2, wherein the water-permeable outer wall of the basket is substantially cylindrical; and the allowing to infiltrate into the basket comprises allowing the storm water to flow radially inward through (1) a substantially cylindrical water-permeable surrounding wall, (2) through the bed material able to absorb pollutants, the bed disposed in an annular space between said outer substantially cylindrical wall and the inner waterpermeable wall, said inner wall substantially cylindrical and concentric with the outer wall, (3) through said inner wall, and (4) into an internal cylindrical drainage space of the basket, the drainage space in fluid communication with a treated water outlet of the basket.

4. The method of claim 1, wherein the step of treating, by removing of pollutants comprises removing by passing the storm water through a bed selected from the group consisting of compost, vermiculite, activated carbon, zeolite, perlite, ion exchangers, peat, and sand beds.

5. The method of claim 1, wherein the step of treating by removing of pollutants comprises passing the storm water through a bed comprising pellets, the pellets selected from the group of pellets consisting of compost, vermiculite, activated carbon, zeolite, perlite, ion exchangers, peat, and sand pellets.

6. The method of claim 1, wherein the controlling of flow rate is by a flow restrictor in a water outlet of the basket downstream of the bed.

7. The method of claim 1, wherein the controlling of flow rate is by an orifice plate having an orifice of predetermined diameter, the orifice plate located in a treated water outlet conduit of the basket, the outlet downstream of the bed.

* * * * *